United States Patent [19]

Geiger et al.

[11] Patent Number: 4,648,172
[45] Date of Patent: Mar. 10, 1987

[54] MACHINE TOOL FOR HAVING A SPINDLE-HEAD CARRIER AND A SPINDLEHEAD WHICH IS SUPPORTED SWINGABLY THEREON

[75] Inventors: Michael Geiger, Starnberg; Bernd Finsterwalder; Franz Kagerer, both of Munich, all of Fed. Rep. of Germany

[73] Assignee: Friedrich Deckel Aktiengesellschaft, Munich, Fed. Rep. of Germany

[21] Appl. No.: 466,747

[22] Filed: Feb. 15, 1983

[30] Foreign Application Priority Data

Feb. 19, 1982 [DE] Fed. Rep. of Germany ....... 3206121

[51] Int. Cl.⁴ ............................................. B23Q 3/157
[52] U.S. Cl. ...................................... 29/568; 409/144;
409/201; 409/230
[58] Field of Search ............... 409/144, 201, 211, 215,
409/216, 204, 230, 233, 231; 408/35, 23 W, 239
R, 239 A; 279/57; 29/264, 485 R, 45.5 A, 568

[56] References Cited

U.S. PATENT DOCUMENTS

| 2,685,122 | 8/1954 | Berthiez | 408/35 X |
| 3,023,677 | 3/1962 | Chanlat | 409/230 X |
| 3,483,796 | 12/1969 | Galbarini et al. | 409/216 |
| 3,722,361 | 3/1973 | Rinck | 409/215 |
| 3,735,459 | 5/1973 | Allen | 408/236 X |
| 3,762,036 | 10/1973 | Goebel et al. | 408/35 X |
| 3,984,905 | 10/1976 | Petzoldt | 408/35 X |
| 4,011,791 | 3/1977 | Lanzenberger | 408/239 A X |
| 4,051,583 | 10/1977 | Kato et al. | 409/231 X |
| 4,063,488 | 12/1977 | Kagerer | 279/57 X |
| 4,478,540 | 10/1984 | Sachot | 409/211 |
| 4,499,800 | 2/1985 | Stahl | 409/233 X |

FOREIGN PATENT DOCUMENTS 303777 7/1915 Fed. Rep. of Germany ...... 409/201

Primary Examiner—Gil Weidenfeld
Assistant Examiner—Glenn L. Webb
Attorney, Agent, or Firm—Flynn, Thiel, Boutell & Tanis

[57] ABSTRACT

Machine tool comprising a spindlehead which can be swung into several operating positions. Coupling devices are provided, which in each operating position couple the spindle with a drive shaft from the drive motor or the transmission. In an intermediate position, the spindle is in the area of a tool changer for facilitating an automatic tool exchange.

13 Claims, 9 Drawing Figures

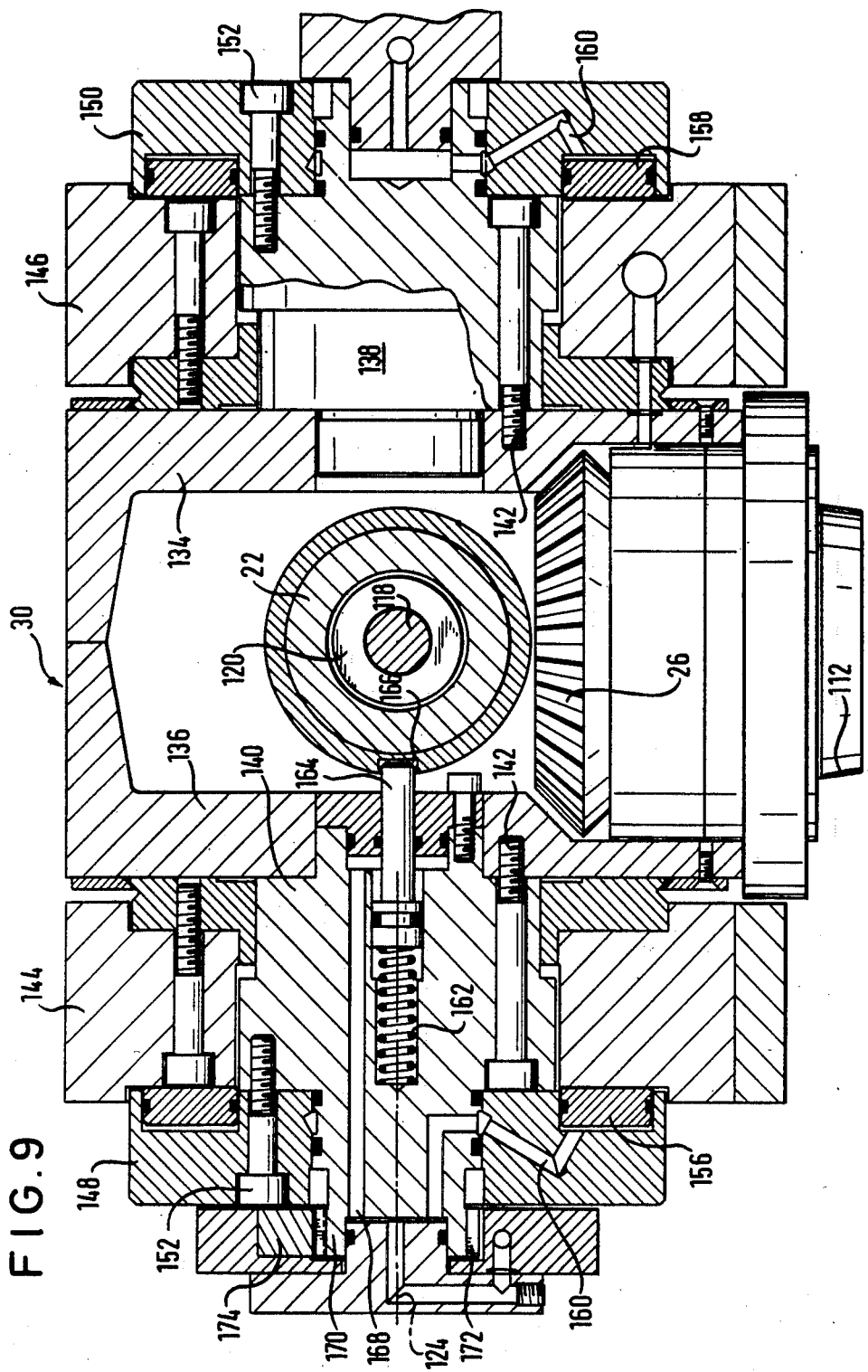

MACHINE TOOL FOR HAVING A SPINDLE-HEAD CARRIER AND A SPINDLEHEAD WHICH IS SUPPORTED SWINGABLY THEREON

FIELD OF THE INVENTION

The invention relates to a machine tool having a spindlehead swingable to multiple positions including a tool exchanging position.

BACKGROUND OF THE INVENTION

In order to keep the swingable spindlehead as compact and light as possible, in the known machines of this class, the spindlehead contains mostly only the work spindle with the clamping devices, while the drive motor, the transmission and, if desired, the drive shaft which connects the transmission to the work spindle are arranged in nonswingable parts, thus for example the spindlehead carrier. A constructively simple solution results, when the spindlehead can be pivoted about an axis which lies in the direction of the drive shaft, since then the drive transmission can be formed by the drive shaft through a simple bevel gear pair. However, there are a number of types of machines in which it is necessary, for reasons which lie in the special division of the operating movements on the tool or workpiece, for a pivoting to occur about a drive shaft which is arranged transversely with respect to the spindlehead carrier.

A machine tool of this class is already known in which on a spindlehead carrier, which is movably supported in transverse direction, a spindlehead is pivotal continuously about an axis which lies transversely with respect to the drive shaft arranged in the spindle-head carrier (German OS No. 21 31 537). This results in an extremely complicated deflection of the driving movement from the drive shaft to the work spindle, which includes for example two bevel-gear pairs and three spur gears. The construction is therefore expensive and complicated and has moreover the disadvantage that the reversing gearing is loud and produces much damaging heat, which in turn influences the exactness of the machine.

It is the purpose of the present invention to provide a machine tool of this class, which can be substantially simpler in design and thus substantially more economical and also more exact.

This purpose is attained by the provision of a spindlehead which can be adjusted into several defined operating positions and that coupling devices for coupling of the work spindle with the drive shaft are associated with the work spindle and/or the drive shaft for each operating position. The recognition was thereby utilized that a continuous adjustability of the spindlehead is not utilized as a rule and cannot be utilized as a rule, since for example the exact adjustment of any desired swinging positions again demands a considerable expense with respect to the measuring, positioning and fixing means. Rather a few selected swinging positions which are to be fixed exactly for example through stops, are sufficient. In most cases, in connection with rotatable and swingable worktables, even only two positions, namely the horizontal and vertical position of the work spindle are sufficient.

In a first modification of the inventive solution, the input side of the work spindle is branched corresponding with the possible swinging positions, whereby the branches can each be aligned with respect to the drive spindle and can be coupled with same; in a second modification, the drive shaft is branched corresponding with the possible swinging positions and the work spindle is coupled with the various branches. The branches are formed preferably by stub shafts which are connected with the work spindle or the drive shaft through bevel gears and which are arranged angularly offset with respect thereto. The coupling means can then engage either on the stub shafts or the associated shaft or spindle end or can be formed by bevel gears in a different development of the invention, which bevel gears engage the above-mentioned bevel gears of the branches.

In a preferred exemplary embodiment having coupling means which engage the stub shafts, the stub shafts (or the spindle end itself) can be aligned in the various operating positions of the spindlehead, each coaxially with respect to the drive spindle and the drive shaft can be coupled with or uncoupled therefrom by longitudinal movement thereof.

In many cases, a spring-loaded clamping device is provided within the work spindle, which clamping device can be released by pressing onto an operating pin or the like which projects beyond the rearward end of the drive spindle. In such a case, it is inventively provided that the spindlehead can be swung into a toolexchanging position, in which the rearward end of the work spindle is provided in the area of an operating device which is arranged stationarily in the machine. In this manner, the inventive machine tool can also be equipped with an automatic tool changer.

BRIEF DESCRIPTION OF THE DRAWINGS

Further characteristics and advantages of the invention are contained in the claims, the drawings and the following drawing description. Several exemplary embodiments of the invention are illustrated in the drawings and are described in greater detail hereinafter.

In the drawings:

FIG. 9 is a cross-sectional view taken along the line VIII—VIII of FIG. 8 of an arrangement according to FIG. 8.

DETAILED DESCRIPTION

Figure 1:
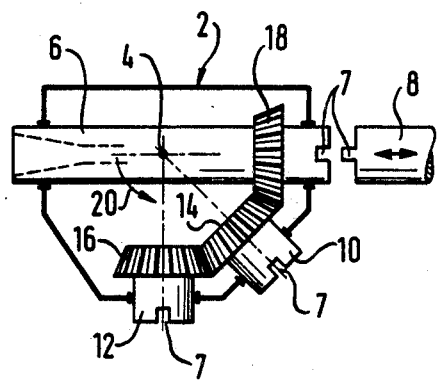
FIG. 1 is a schematic side view of an arrangement having a spindlehead which can be adjusted in three operating positions with a triple branched work spindle.

FIG. 1 very schematically illustrates the spindlehead 2 of a machine tool, which spindlehead is pivotally supported about an axis 4, for example, on a spindlehead carrier which is arranged on the machine in a manner which is not identified in detail. The work spindle 6 is rotatably supported in the spindlehead. A drive shaft 8, which is supported in the spindlehead carrier, can be coupled for example through longitudinal movement relative to the work spindle 6 through a coupling means 7. The spindlehead can assume three operating positions. In the illustrated operating position, the spindle end is aligned coaxially with respect to the drive shaft 8. The driving power is transmitted directly from the drive shaft 8 onto the work spindle 6. The two stub shafts 10, 12 are drivingly rotated through associated bevel gears 14, 16, connected to the bevel gear 18 which is arranged on the work spindle. At a position which is swung 45° in direction of the arrow 20, the stub shaft 10 can be coupled to the drive shaft 8. Similarly, at a 90° swing of the stub shaft 12, the stub shaft 12 can be coupled to the drive shaft 8.

Figure 2:
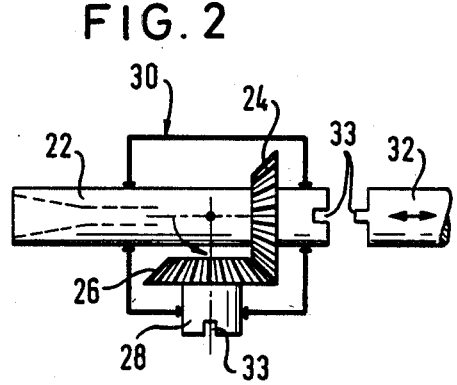
FIG. 2 illustrates an arrangement according to FIG. 1, however, having a double branched work spindle for two operating positions.

FIG. 2 provides only one single stub shaft 28 which is connected to the work spindle 22 through the bevel gears 24, 26, which stub shaft is positioned at a right angle with respect to the work spindle 22. Thus the spindlehead 30 can be adjusted to two operating positions, namely, horizontally or vertically. The coupling again occurs by axial movement of the drive shaft 32 and the interengagement of coupling means 33.

Figure 3:
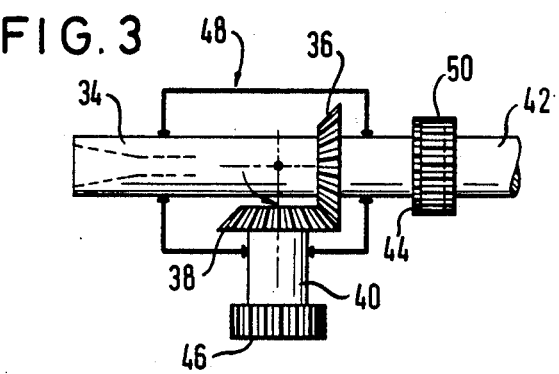
FIG. 3 illustrates an arrangement according to FIG. 2, however, having a changed coupling means.

FIG. 3 illustrates an arrangement, substantially corresponding with FIG. 2, having a work spindle 34, a stub shaft 40 which is positioned perpendicularly thereto and is connected to it through bevel gears 36, 38 and a drive shaft 42 which is supported in a spindle-head carrier which is not illustrated. The coupling means are formed by gears 44, 46 which are arranged on the work spindle 34 and the stub shaft 40, respectively and which gears, during a swinging of the spindlehead 48, engage the gear 50, which is arranged on the drive shaft 42, or after the swinging operation engage through movement of the drive shaft.

Figure 4:
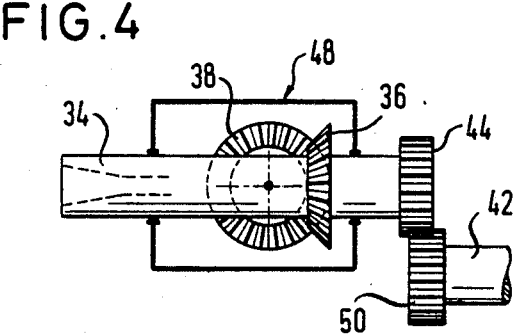
FIG. 4 is a top view of an arrangement according to FIG. 3.

FIG. 4 illustrates the same arrangement in a top view, so that the side-by-side offset position of the work spindle 34 and of the drive shaft 42 can be recognized.

Figure 5:
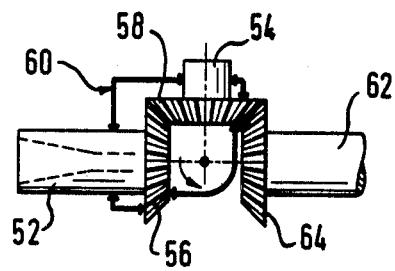
FIG. 5 is an arrangement having a double branched work spindle and changed coupling means.

FIG. 5 illustrates a further solution again having a work spindle 52 and a stub shaft 54 which is positioned perpendicularly thereto, which are connected rotationally with one another through bevel gears 56, 58. During a swinging of the spindlehead 60, either the bevel gear 58 (see illustration) or the bevel gear 56 engages the bevel gear 64, which is arranged on the drive shaft 62, which with this simultaneously serve as the coupling means.

Figure 6:
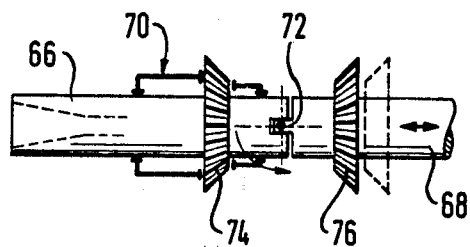
FIG. 6 illustrates a modified arrangement, also for two operating positions.

FIG. 6 illustrates a further exemplary embodiment, in which no branching of the work spindle 66 or of the drive shaft 68 is provided. The spindlehead 70 can assume two positions which lie perpendicular with respect to one another. In the illustrated position, the work spindle 66 is coupled through a coupling means 72, which are constructed as claws, with the axially movable drive shaft 68. In the not illustrated swinging position, in which the work spindle is directed vertically downwardly, the bevel gear 74, which is arranged on the work spindle 66, engages the bevel gear 76 which is arranged on the drive shaft.

Figure 7:
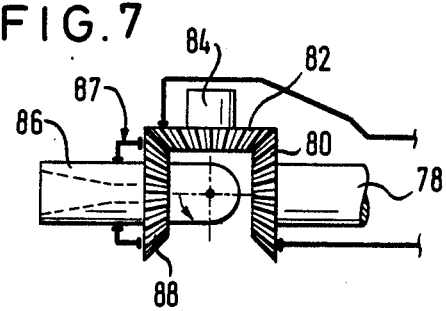
FIG. 7 illustrates an arrangement having a double branched drive shaft for two operating positions.

FIG. 7 finally illustrates a constructive solution, in which the drive shaft 78 is branched. It is rotationally connected through a bevel gear pair 80, 82 to a sub shaft 84 which is positioned perpendicularly thereto. The work spindle 86 can in turn be swung with the spindlehead 87 between a horizontal position (see FIG. 7), in which the bevel gear 86 which is arranged on same engages the bevel gear 82, and a vertical position, in which the bevel gear 88 engages the bevel gear 80. Said bevel gears 80, 82, 88 form simultaneously the coupling means. The solution according to FIG. 7 thus represents a reversal of the solution according to FIG. 5.

Figure 8:
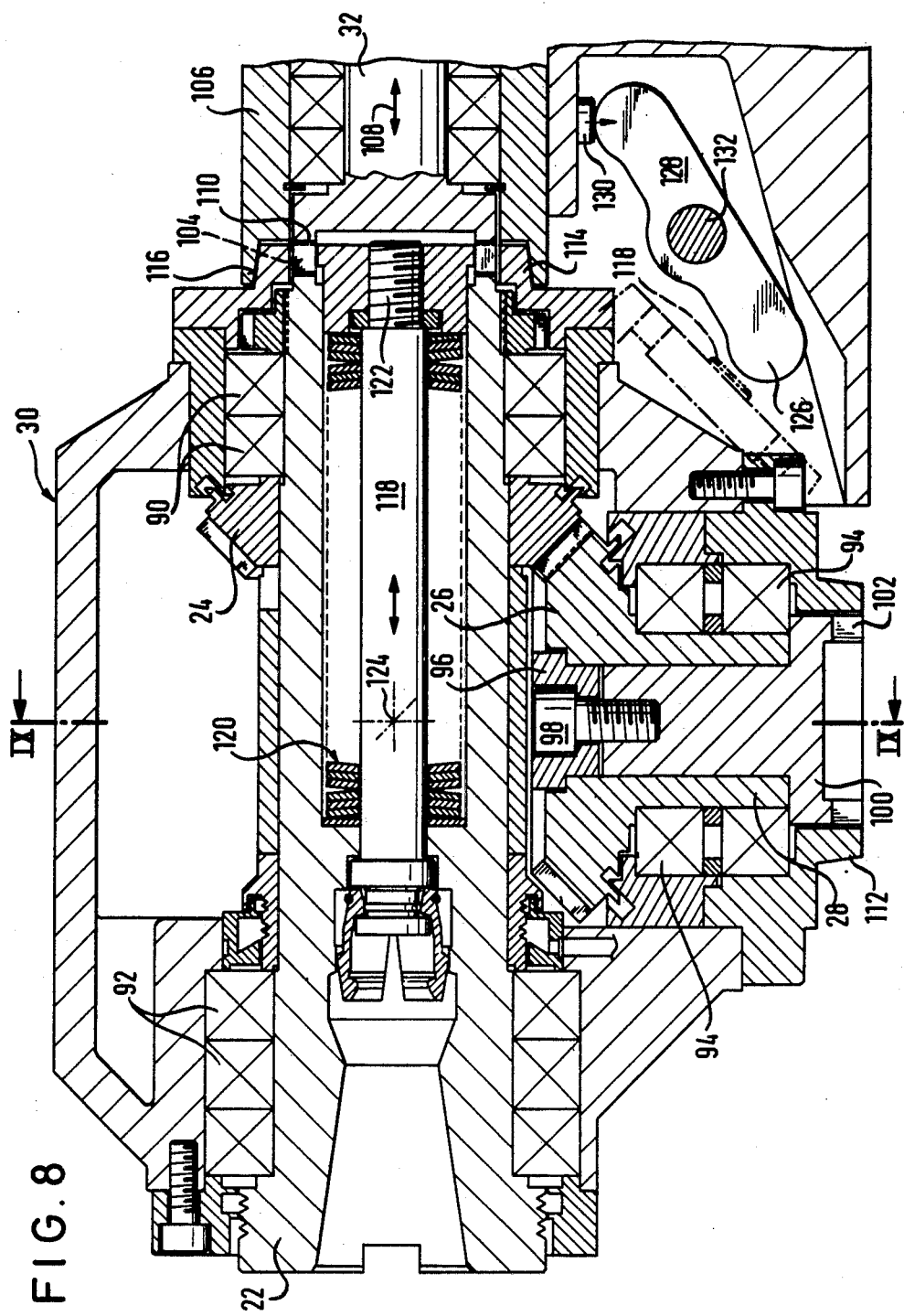
FIG. 8 is a detailed illustration of a side view of an arrangement approximately according to FIG. 2.

FIG. 8 illustrates an arrangement according to FIG. 2 in more exact illustration. In the housing of the spindlehead 30, the work spindle 22 is supported rotatably through bearings 90, 92. A bevel gear 24 is wedged or forced fit onto the work spindle 22. Same engages a bevel gear 26, which is constructed in one piece with the stub shaft 28 which is arranged at a right angle with respect to the work spindle 22 and is supported also through bearings 94 in the housing of the spindlehead 30. The coupling means are formed by a coupling insert 100 which is inserted from the coupling side into the stub shaft 28 and is wedged with or forced fit into same, and is held by a countersleeve 96 and a screw 98, on which coupling insert are constructed coupling claws 102.

The end of the work spindle 22, which end is on the coupling side, is constructed in the same manner as the insert 100 and is also provided with coupling claws 104.

The drive shaft 32 is supported in a sleeve 106 and is arranged axially movably together with said sleeve in the direction of arrow 108 in a spindlehead carrier which is not illustrated in detail. The drive shaft 32 has formed at its end remote from the spindlehead the counterpiece defining the coupling means of the coupling insert 100 or the end of the work spindle 22 and engages positively with coupling claws 110 thereon the coupling claws 102, 104.

On the housing of the spindlehead 30 there are constructed, or rather arranged in the area of the couplings, slightly bevel-shaped flanges 112 or 114, each of which cooperate with a centering cone 116 which is constructed on the sleeve 106 and is formed complementary thereto, to facilitate an exact position fixing of the spindlehead in its operating positions. The centering cone moves during coupling in of the drive shaft 32 in each case over the flanges 114 (as illustrated) or 112.

Within the work spindle there is arranged in a conventional manner a tool clamping system having a spreader bar 118, which is loaded in clamping direction by a cup-spring package 120 and, through pressure onto the end 122 of the spreader bar 118, is positioned to an intermediate position opposite the free end 126 of rocking lever 128. The rocking lever 128 can be pivoted about the axis 132 by a push-rod 130 through a servo-drive (not illustrated), whereby it urges the end 122 of the spreader bar 118 in the release direction, so that a tool exchange can be carried out.

FIG. 9 illustrates in a cross-sectional illustration along the line VIII—VIII of FIG. 8 in particular the support and the swivel drive of the spindlehead 30. Trunnions 138, 140 are secured by screws 142 to the sidewalls 134, 136 of the spindlehead, which screws are supported slidingly in the side parts 144, 146 of the spindlehead carrier, constructed in this embodiment as a forked or bifurcated head. A flange 148 or 150 is secured by screws 152 from outside onto each trunnion 138 or 140, which screws during the existence of lateral stresses on the spindlehead assure a distribution of the load on both side pieces 144, 146. Clamp collars 156, 158 are arranged between the flanges 148 or 150 and the associated side pieces 144 or 146, which clamp collars are supplied through passageways 160 with pressurized oil or the like and fix the spindlehead it is operating positions or the tool-exchanging position.

A locating pin 164, which is biased by a spring 162, is movably supported in the trunnion 140, which locating pin in the fixing position extends into a fixing recess 166 which is constructed on the work spindle 22 and can fix the work spindle in a certain angular position. The locating pin 164 can be moved into the release direction also through pressurized oil through the passageway 168.

A tooth system 172 is constructed on an outwardly projecting extension 170 of the trunnion 140, which tooth system cooperates with a rack 174, which in turn is part of a servodrive. During movement of the rack 174, the spindlehead is pivoted about the axis 124.

Although particular preferred embodiments of the invention have been disclosed in detail for illustrative purposes, it will be recognized that variations or modifications of the disclosed apparatus, including the rearrangement of parts, lie within the scope of the invention.

The embodiments of the invention in which an exclusive property or privilege is claimed are defined as follows:

1. A machine tool, comprising: a spindlehead carrier having a drive shaft rotatably supported thereon and a drive motor drivingly coupled to said drive shaft; a spindlehead which is supported on said spindlehead carrier for pivotal movement about a swivel axis which extends transversely to said drive shaft, wherein said spindlehead can be pivotally moved into at least two operational positions and has a working spindle rotatably supported thereon; coupling means for drivingly coupling said drive shaft to said working spindle in each said operational position; and clamping means which is provided within said working spindle and which includes a clamping member biased by resilient means and having an end which projects beyond an end of said working spindle, movement of said clamping member away from an initial position thereof against the urging of said resilient means effecting a release of said clamping means; wherein said spindlehead can also be pivoted into a tool-changing position in which said end of said clamping member is positioned in the region of a stationary operating mechanism which includes selectively actuable means for engaging said clamping member and moving it away from said initial position in order to effect a release of said clamping means; wherein said coupling means includes a stub shaft which is rotatably supported on said spindlehead and has an end which is angularly offset about said swivel axis from an end of said working spindle, said working spindle and stub shaft each having a bevel gear thereon and said bevel gears being in continuous meshing engagement in order to cause said working spindle and stub shaft to rotate simultaneously; wherein said coupling means includes means for drivingly coupling said drive shaft to said working spindle in a first of said operational positions and for drivingly coupling said drive shaft to said stub shaft in a second of said operational positions; wherein said working spindle and said stub shaft are respectively coaxially aligned with said drive shaft in said first and second operational positions; and wherein said coupling means includes said drive shaft being supported for axial movement relative to said spindlehead carrier, axial movement of said drive shaft toward and away from a respective one of said working spindle and stub shaft coaxially aligned therewith causing said drive shaft to be respectively coupled to and decoupled from said one of said working spindle and said stub shaft aligned therewith.

2. The machine tool according to claim 1, wherein said coupling means includes said ends of said working spindle and said stub shaft each having a coupling tooth thereon which is engageable with a coupling tooth provided on said end of said drive shaft.

3. The machine tool according to claim 2, wherein said drive shaft is surrounded by a sleeve which is fixed against rotation, can be moved axially with said drive shaft, and has at an end thereof which faces said spindlehead a conical centering surface, and wherein said spindlehead includes, in the region of said end of said stub shaft and said end of said working spindle, flanges having conical surfaces which are complementary to said centering surface and cooperate therewith during axial movement of said drive shaft and sleeve in order to guide said drive shaft and a respective one of said working spindle and said stub shaft into coaxial alignment.

4. The machine tool according to claim 1, wherein said spindlehead carrier is a forked head having two spaced side pieces, and wherein said side pieces of said spindlehead carrier are disposed on opposite sides of said spindlehead.

5. The machine tool according to claim 4, wherein said side pieces of said forked spindlehead carrier each have further clamping means thereon for releasably clamping said spindlehead in selected angular positions.

6. The machine tool according to claim 1, wherein said spindlehead includes fixing means for releasably holding said working spindle in a predetermined angular position.

7. The machine tool according to claim 6, wherein said fixing means includes a locating pin which is supported for movement radially of said working spindle and can engage a locking recess provided in an outer surface of said working spindle, said locating pin being urged radially toward said working spindle by a spring, and including means for hydraulically moving said locating pin radially outwardly against the force of said spring.

8. The machine tool according to claim 1, including servodrive means for adjusting the angular position of said spindlehead.

9. The machine tool according to claim 1, wherein said clamping means in said working spindle includes: an axial bore provided in said working spindle; collet means which can expand and contract and is provided in said bore at a location spaced axially from said end of said working spindle; said clamping member being an elongate clamping rod which is axially slidably supported in said bore and is operatively coupled to said collet means, axial movement of said rod in opposite directions respectively causing expansion and contraction of said collet means; and said resilient means including a plurality of cup springs which are disposed in said bore and encircle said rod.

10. The machine tool according to claim 9, wherein said stationary operating mechanism includes a lever which is pivotally supported on said spindlehead carrier and a push rod which is axially movably supported on said spindle head carrier and can engage said lever at a location spaced from a pivot axis thereof in order to effect pivotal movement of said lever; and wherein when said spindlehead is in said tool-changing position and said push rod is moved axially, said push rod engages and pivots said lever and a portion of said lever engages said clamping rod and moves it axially against the urging of said cup springs to thereby effect expansion of said collet means.

11. A machine tool, comprising: a spindlehead carrier having a drive shaft rotatably supported thereon and a drive motor drivingly coupled to said drive shaft; a spindlehead which is supported on said spindlehead carrier for pivotal movement about a swivel axis which extends transversely to said drive shaft, wherein said spindlehead can be pivotally moved into at least two operational positions and has a working spindle rotatably supported thereon; coupling means for drivingly coupling said drive shaft to said working spindle in each said operational position; and clamping means which is provided within said working spindle and which includes a clamping member biased by resilient means and having an end which projects beyond an end of said working spindle, movement of said clamping member away from an initial position thereof against the urging of said resilient means effecting a release of said clamping means; wherein said spindlehead can also be pivoted into a tool-changing position in which said end of said clamping member is positioned in the region of a stationary operating mechanism which includes selectively actuable means for engaging said clamping member and moving it away from said initial position in order to effect a release of said clamping means; wherein said coupling means includes a stub shaft which is rotatably supported on said spindlehead and has an end which is angularly offset about said swivel axis from an end of said working spindle, said working spindle and stub shaft each having a bevel gear thereon and said bevel gears being in continuous meshing engagement in order to cause said working spindle and stub shaft to rotate simultaneously; wherein said coupling means includes means for drivingly coupling said drive shaft to said working spindle in a first of said operational positions and for drivingly coupling said drive shaft to said stub shaft in a second of said operational positions; and wherein said coupling means includes said ends of said working spindle and said stub shaft each having thereon a gear which is engageable with a gear provided on said end of said drive shaft.

12. A machine tool, comprising: a spindlehead carrier having a drive shaft rotatably supported thereon and a drive motor drivingly coupled to said drive shaft; a spindlehead which is supported on said spindlehead carrier for pivotal movement about a swivel axis which extends transversely to said drive shaft, wherein said spindlehead can be pivotally moved into at least two operational positions and has a working spindle rotatably supported thereon; coupling means for drivingly coupling said drive shaft to said working spindle in each said operational position; and clamping means which is provided within said working spindle and which includes a clamping member biased by resilient means and having an end which projects beyond an end of said working spindle, movement of said clamping member away from an initial position thereof against the urging of said resilient means effecting a release of said clamping means; wherein said spindlehead can also be pivoted into a tool-changing position in which said end of said clamping member is positioned in the region of a stationary operating mechanism which includes selectively actuable means for engaging said clamping member and moving it away from said initial position in order to effect a release of said clamping means; wherein said coupling means includes a stub shaft which is rotatably supported on said spindlehead and has an end which is angularly offset about said swivel axis from an end of said working spindle, said working spindle and stub shaft each having a bevel gear thereon and said bevel gears being in continuous meshing engagement in order to cause said working spindle and stub shaft to rotate simultaneously; wherein said coupling means includes means for drivingly coupling said drive shaft to said working spindle in a first of said operational positions and for drivingly coupling said drive shaft to said stub shaft in a second of said operational positions; and wherein said coupling means includes said drive shaft having a bevel gear on said end thereof, said bevel gear on said drive shaft drivingly engaging said bevel gear on said working spindle in said first operational position and drivingly engaging said bevel gear on said stub shaft in said second operational position.

13. A machine tool, comprising: a spindlehead carrier having a drive shaft rotatably supported thereon and a drive motor drivingly coupled to said drive shaft; a spindlehead which is supported on said spindlehead carrier for pivotal movement about a swivel axis which extends transversely to said drive shaft, wherein said spindlehead can be pivotally moved into at least two operational positions and has a working spindle rotatably supported thereon; coupling means for drivingly coupling said drive shaft to said working spindle in each said operational position; and clamping means which is provided within said working spindle and which includes a clamping member biased by resilient means and having an end which projects beyond an end of said working spindle, movement of said clamping member away from an initial position thereof against the urging of said resilient means effecting a release of said clamping means; wherein said spindlehead can also be pivoted into a tool-changing position in which said end of said clamping member is positioned in the region of a stationary operating mechanism which includes selectively actuable means for engaging said clamping member and moving it away from said initial position in order to effect a release of said clamping means; wherein in a first of said operational positions said drive shaft and said working spindle are coaxially aligned; wherein said coupling means includes said working spindle and said drive shaft each having a bevel gear thereon and each having at an end thereof a coupling tooth, and includes said drive shaft being axially movable relative to said working spindle in said first of said operational positions between two positions in which said coupling teeth thereon are respectively engaged and disengaged; and wherein in a second of said operational positions said drive shaft and said working spindle are arranged at an angle with respect to each other and said bevel gears thereon are in meshing engagement with each other.

* * * * *